May 24, 1966  R. F. ROMANOWSKI  3,253,206
WINDSHIELD WIPER ACTUATING MECHANISM
Filed Dec. 23, 1963  4 Sheets-Sheet 1
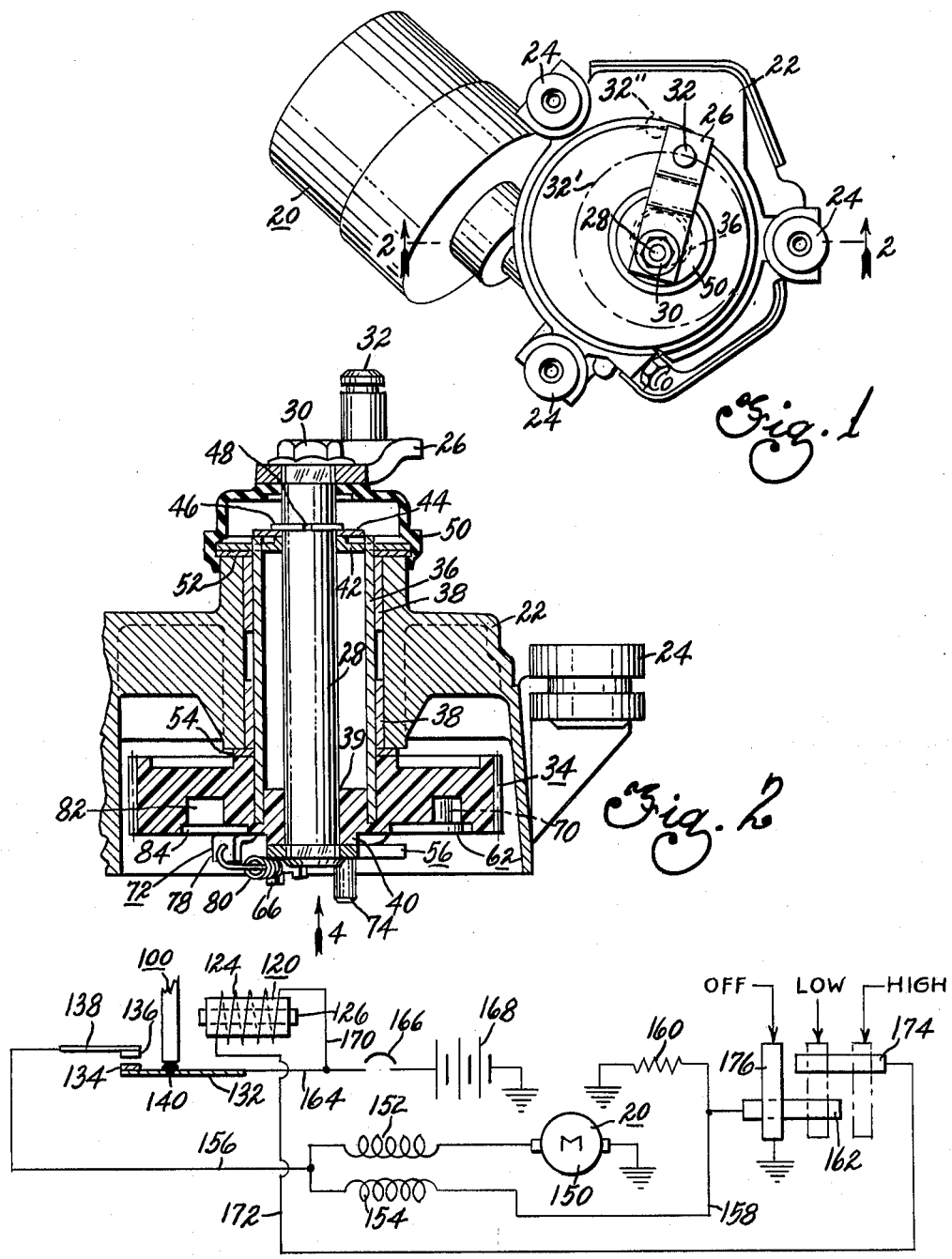
INVENTOR.
ROBERT F. ROMANOWSKI
BY
W. E. Finchen
HIS ATTORNEY May 24, 1966  R. F. ROMANOWSKI  3,253,206
WINDSHIELD WIPER ACTUATING MECHANISM
Filed Dec. 23, 1963  4 Sheets-Sheet 2

INVENTOR.
ROBERT F. ROMANOWSKI
BY
W. E. Finken
HIS ATTORNEY

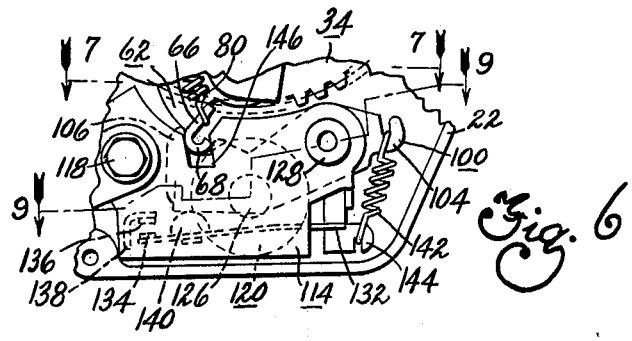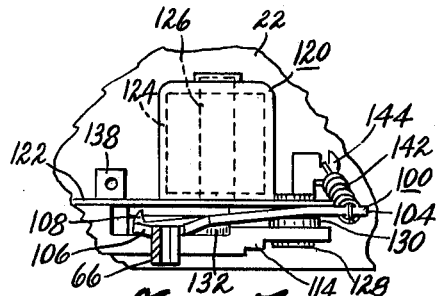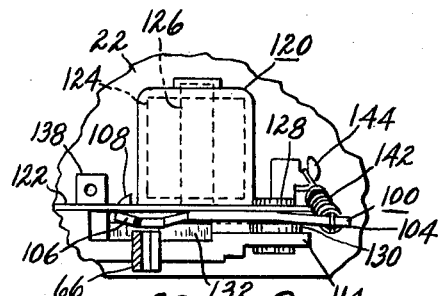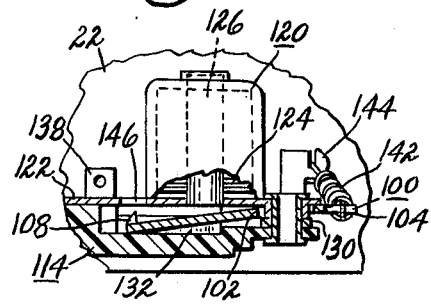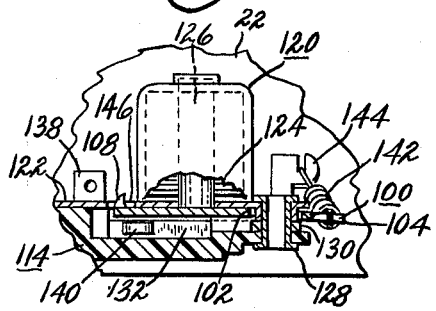

May 24, 1966 R. F. ROMANOWSKI 3,253,206
WINDSHIELD WIPER ACTUATING MECHANISM
Filed Dec. 23, 1963 4 Sheets-Sheet 4
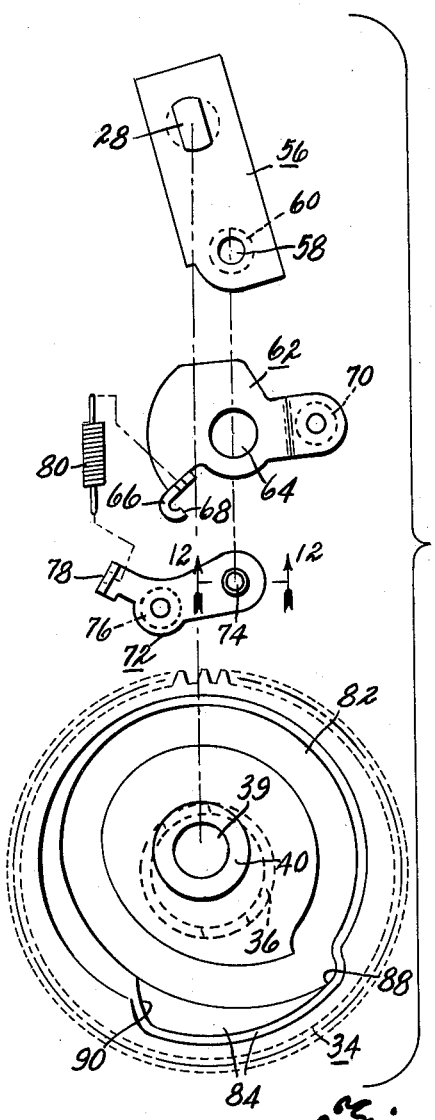
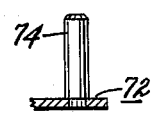
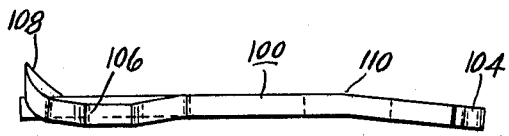
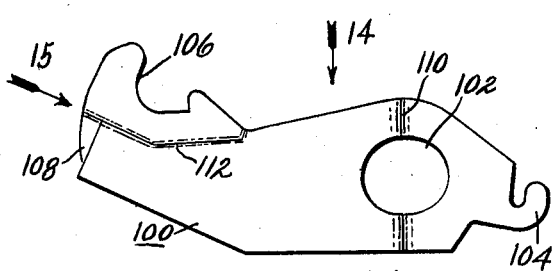
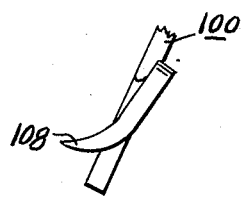
INVENTOR.
ROBERT F. ROMANOWSKI
BY
W. E. Fisher
HIS ATTORNEY

United States Patent Office 3,253,206
Patented May 24, 1966

3,253,206
WINDSHIELD WIPER ACTUATING MECHANISM
Robert F. Romanowski, Rochester, N.Y., assignor to General Motors Corporation, Detroit, Mich., a corporation of Delaware
Filed Dec. 23, 1963, Ser. No. 332,753
14 Claims. (Cl. 318—466)

This invention pertains to windshield wiper actuating mechanism, and particularly to an improved variable throw crank assembly operable from a rotary power source and control mechanism therefor.

Heretofore, windshield wiper actuating mechanisms have been devised embodying a rotatable crank connected through suitable linkage means for oscillating a pair of wiper assemblies throughout a running stroke, and wherein rotation of the crank can be substantially arrested and the throw of the crank varied to move the wiper assemblies to a depressed parked position. A mechanism of the aforesaid type is disclosed in Contant et al. Patent 2,985,024. The present invention relates to an improved wiper actuating mechanism driven from a rotary power source including a simplified interruptible driving connection between the crank and the rotary power source, and simplified and more reliable control means for the crank mechanism and the electric motor which constitutes a rotary power source in the exemplary embodiment disclosed.

Accordingly, among my objects are the provision of an improved variable throw crank assembly for windshield wiper actuating mechanisms; the further provision of a variable throw crank assembly wherein rotary movement of the crank is substantially arrested prior to varying the throw thereof including simplified means constituting the interruptible driving connection between the power source and the crank assembly; the still further provision of electric motor driven windshield wiper actuating and control mechanism including an improved parking switch and control means therefor; and the still further provision of an improved windshield wiper actuating and control mechanism driven by an electric motor including electromagnetic means for controlling the throw of the crank assembly and the energizing circuit of the electric motor.

The aforementioned and other objects are accomplished in the present invention by embodying an eccentric for shifting the axis of a shaft which carries a crank arm in combination with means for substantially arresting rotation of the shaft prior to shifting the axis thereof. Specifically, the improved wiper actuating mechanism is designed for use with a unidirectional electric motor having an electromagnetically closed, mechanically opened, parking switch in the energizing circuit of the motor. The variable throw crank assembly has an interruptible driving connection with a motor driven gear and is attached to a shaft having its axis offset relative to the axis of the gear. During normal wiper operation the crank assembly rotates with the gear about the axis thereof with a fixed throw. The control mechanism includes a latch engageable with the crank assembly for interrupting the driving connection and substantially arresting rotation thereof such that continued rotation of the crank increases the throw of the crank assembly to move the wiper assemblies to a depressed parked position. When the crank throw is substantially a maximum the parking switch is mechanically opened to automatically deenergize the motor and thus arrest rotation of the drive gear.

Further objects and advantages of the present invention will be apparent from the following description, reference being had to the accompanying drawings, wherein a preferred embodiment of the present invention is clearly shown, and wherein similar numerals depict similar parts throughout the several views.

In the drawings:

FIGURE 1 is a plan view in elevation of the improved wiper actuating mechanism.

FIGURE 2 is an enlarged fragmentary sectional view taken along line 2—2 of FIGURE 1 of the improved variable throw crank assembly.

FIGURE 3 is a schematic wiring diagram of the improved circuit for the electric wiper motor.

FIGURE 6 is a fragmentary view, in elevation, depicting the control mechanism in its parked position.

FIGURE 7 is a fragmentary view, partly in section and partly in elevation, taken along line 7—7 of FIGURE 6 with the electromagnetic control means deenergized.

FIGURE 8 is a view similar to FIGURE 7 with the electromagnetic control means energized.

FIGURE 9 is a fragmentary sectional view taken along line 9—9 of FIGURE 6, partly in section and partly in elevation, with certain parts broken away with the electromagnetic control means deenergized.

FIGURE 10 is a view similar to FIGURE 9 with the electromagnetic control means energized.

FIGURE 11 is an exploded view of certain parts of the crank assembly.

FIGURE 12 is a fragmentary sectional view taken along line 12—12 of FIGURE 11.

FIGURE 13 is a plan view of the latch arm.

FIGURE 14 is a side view taken in the direction of arrow 14 of FIGURE 13 of the latch arm.

FIGURE 15 is a fragmentary view of the latch arm taken in the direction of arrow 15 of FIGURE 13.

Figure 4:
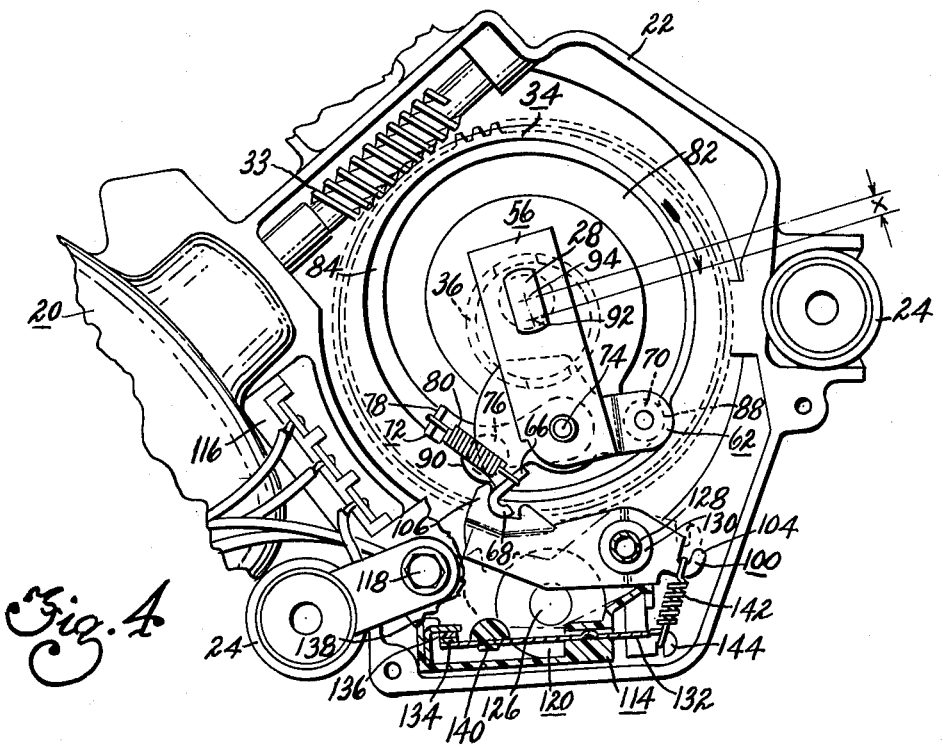
FIGURE 4 is a fragmentary view, partly in section and partly in elevation, taken in the direction of arrow 4 of FIGURE 2 with the crank assembly in its running position.

With particular reference to FIGURE 1, the improved windshield wiper actuating mechanism is driven by a unidirectional direct current electric motor 20 having an end casting 22 which encloses a worm and worm gear reduction unit and the variable throw crank assembly and control mechanism of the present invention. The end casting, or housing 22, includes three grommet supports 24 by which the wiper actuating mechanism can be attached to a support within a motor vehicle. The crank assembly includes a rotary crank arm 26 attached to a shaft 28 by a lock nut 30 having a crank arm 26 attached to a shaft 28 by a lock nut 30 having a crank pin 32 adjacent its outer end. During running operation of the wiper actuating mechanism the crank pin 32 rotates in an orbit indicated by broken line 32', while during parking operation the crank pin 32 is moved radially outward to the position 32" as shown in FIGURE 1. This increase in the throw of the crank from the running orbit 32' to the parked position 32" is sufficient to move the wiper assemblies comprising the wiper arms and blades beyond the inboard ends of the running strokes to depressed parked positions.

Referring to FIGURE 2, the worm gear speed reduction unit includes a worm integral with the armature shaft, not shown, of the motor 20 that meshes with a nylon worm gear 34. The worm gear 34 is suitably interlocked with a hollow metallic hub 36 journalled by spaced sleeve bearings 38 in the housing 22. The hub 36 is concentric with the axis of the worm gear 34, and the worm gear has an offset, or eccentric bore 39 formed therein for receiving the shaft 28. The face of the worm gear 34 has a shoulder 40 coaxial with the eccentric bore 39 as seen in FIGURE 2, and one end of the shaft 28 is journalled within the bore 39. The other end of the shaft 28 extends through an apertured shield 42 interlocked with diametrically opposed notches on the hub sleeve 36, the shield 42 being held in assembled relation with the hub sleeve 36, one or more washers 44 and a snap ring 46 situated in an annular groove 48 of the crank shaft 28 and engaging the washer 44. As seen in FIGURE 2, the upper end of a hollow hub 36 is enclosed by an elastomeric seal cap 50 which is suitably attached to the housing 22. A washer 52 is interposed between the shield 42 and the housing 22, and a washer 54 is interposed between the worm gear 34 and the housing 22.

With reference to FIGURE 11, the interruptible driving connection between the shaft 28 and the worm gear 34 comprises a drive plate 56 rigidly attached to the end of the shaft 28 opposite the crank arm 26. The drive plate 56 has a circular opening 58 surrounded by a shoulder 60. The drive pawl 62 has a circular aperture 64 for receiving the shoulder 60 such that the drive pawl is rotatably journaled on the drive plate. In addition, the drive pawl 62 is formed with an integral, upstanding apertured lug 66 having a reversely bent end 68, and an integral cam follower pin 70. A lock pawl 72 has an upstanding pin 74 which extends through the aperture 64 in the drive pawl 62 and the aperture 58 in the drive plate 56 whereby the lock pawl 72 is pivotally supported relative to the drive plate 56. In addition, the lock pawl 72 has an integral cam follower pin 76 and an upstanding apertured lug 78. The lug 66 on the drive pawl 62 and the lug 78 on the hold pawl 72 are interconnected by a coil spring 80 which normally maintains the drive pawl and the lock pawl in the angular relationship depicted in FIGURE 4.

The drive gear 34 has an integral cam track or slot 82 with a raised ledge section 84. The cam track 82 defines a pair of angularly spaced shoulders, or abutments, 88 and 90. In assembling the crank shaft assembly with the drive gear as shown in FIGURE 2 the drive pawl 62 is journaled on the shoulder 60 surrounding the aperture 58 on the drive plate 56. Thereafter, the lock pawl 72 is assembled with the drive plate 56 and the drive pawl 62 by inserting the pin 74 through the aligned apertures in the drive pawl and the drive plate. Thereafter, the lugs 66 and 78 are interconnected by the extension spring 80. This subassembly is then assembled with the gear 34 by inserting the crank shaft 28 through the bearing aperture 39 in the drive gear and moving the entire assembly axially relative to the gear until the cam follower pin 70 on the drive pawl 62 and pin 76 on the lock pawl 72 are seated within the cam slot 82. When the pin 70 is in engagement with the shoulder 88 on the cam follower and the pin 76 is in engagement with the shoulder 90, the shaft 28 is connected for rotation with the drive gear 34.

Figure 5:
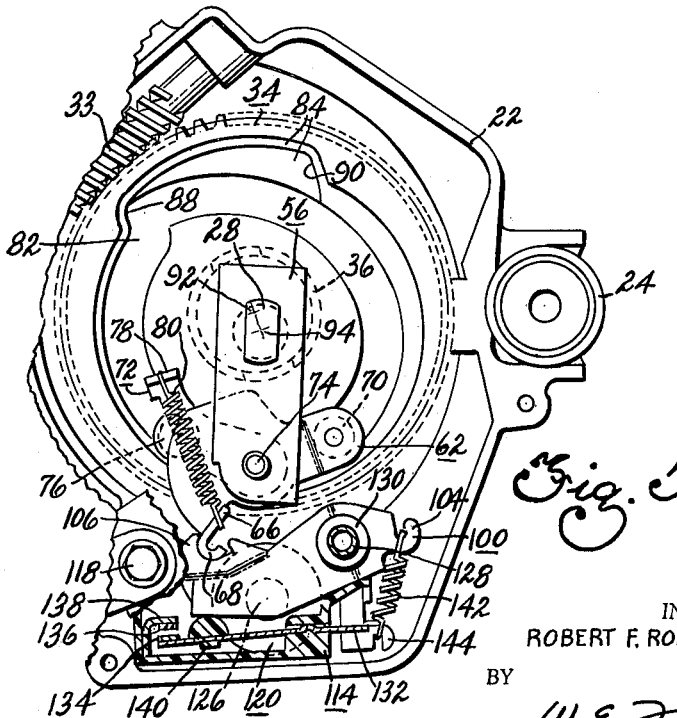
FIGURE 5 is a view similar to FIGURE 4 with the crank assembly in its parked position.

Referring to FIGURES 4 and 5, the worm gear 34 is shown in driving engagement with a worm 33 integral with the armature shaft of the motor 20. When the motor 20 is energized, the worm gear 34 rotates in the clockwise direction as indicated by the arrow. With the cam follower pin 70 of the drive pawl 62 in engagement with the shoulder 88 and the cam follower pin 76 of the lock pawl 72 in engagement with the shoulder 90, rotation will be imparted to the shaft 28 about the axis 92 of the worm gear 34. As clearly seen in FIGURE 4, the axis 94 of the shaft 28 is offset, or spaced, from the axis of the worm gear by a distance X. As long as the drive and lock pawls are engaged with their respective shoulders of the worm gear, the throw of the crank assembly remains constant and the crank pin 32 of the crank arm 26, as shown in FIGURE 1, moves in the circular orbit 32'.

In order to increase the throw of the crank to move the wiper assemblies to depressed parked position, it is necessary to interrupt the driving connection between the shaft 28 and the worm gear 34 during continued rotation of the worm gear 34. In so doing rotation of the shaft 28 is substantially arrested and continued rotation of the worm gear 34 throughout a distance of substantially 180° shifts the axis of the shaft 28 throughout twice the distance X, that is twice the radial offset between the axis 94 of the shaft 28 and the axis 92 of the worm gear 34. In other words, the axis 94 of the shaft 28 is shifted from one side of the axis of the worm gear 34 to the other side thereof as shown in FIGURE 5, this being accomplished by relative rotation between the worm gear 34 and the crank shaft 28 due to the eccentric relationship of these components. In order to interrupt the driving connection between the crank assembly and the worm gear 34, the actuating mechanism of this invention includes a universally mounted latch 100.

Referring to FIGURES 13 through 15, the latch 100 which comprises a steel stamping, is formed with a substantially elliptical opening 102, a spring retaining lug 104, a hook 106 and a cam lug 108. The cam lug 108 is curved outwardly of the plane of the hook 106 as clearly shown in FIGURES 14 and 15, and the function thereof will be pointed out more particularly hereinafter. As seen in FIGURE 14 the latch 100 is transversely bent along a line 110 through the center of the elliptical opening 102, and in addition the hook 106 is angularly offset along a line 112.

Referring to FIGURES 6 through 10, the latch 100 constitutes a component of the electromagnet and switch assembly for controlling the interruptible driving connection between the crank assembly and the drive gear 34 and the energizing circuit for the motor 20. The electromagnet and switch assembly includes a plastic switch housing 114 which, as seen in FIGURE 4, has an integral offset leg portion 116 on which terminals are mounted. The plastic housing 114 is attached to the housing 22 by a bolt 118. An electromagnet 120 including a steel shell 122, a coil 124 and a magnetizable core 126 is attached to the switch housing 114 by a hollow rivet 128 and the bolt 118. The latch 100 is mounted for limited universal movement on the hollow rivet 128 as seen in FIGURE 9, a washer 130 being interposed between the switch housing 114 and the latch 100. By virtue of the elliptical opening 102 in the latch 100 through which the cylindrical rivet 128 passes, it will be appreciated that the latch arm is supported for limited lateral and axial movement as well as pivotal movement relative to the switch housing 114.

As seen more particularly in FIGURES 4 and 5, a parking switch is contained within the switch housing 114 comprising a movable leaf spring switch blade 132 carrying a contact 134 at its free end and a stationary contact 136 connected to a terminal lug 138. The leaf spring switch blade 132 carries a plastic button, or actuator 140, adjacent its contact carrying end, which button is engageable by the latch 100 to separate the contacts 134 and 136 so as to deenergize the motor 20 when the crank throw is substantially a maximum and the wiper assemblies are moved to their depressed parked positions as shown in FIGURE 5. The latch 100 is biased in the clockwise direction about its pivotal connection with the switch housing by a coil spring 142, one end of which engages the lub 104 of the latch, and the other end of which engages a lug 144 integral with the shell 122 of the electromagnet. In addition to biasing the latch 100 in a clockwise direction, the spring 142 urges the latch 100 towards the switch housing 114 due to the angular relation between the lugs 144 and 104. That is, the lug 144 is located above the plane of the lug 104 on the latch as clearly shown in FIGURES 7 through 10.

The electromagnet 120 is energized in FIGURES 8 and 10, and deenergized in FIGURES 7 and 9. The latch 100, the drive pawl 62, and the parking switch are shown in the parked positions in FIGURE 6. In this position it will be noted that the lug 66 of the drive pawl is held by the hook 106 of the latch and, in addition, has a portion thereof situated in a guide slot 146 of the switch housing 114. The latch arm is in engagement with the actuator 140 thereby deflecting the latch spring switch blade 132 so as to separate contacts 134 and 136. The electromagnet 120 is deenergized, and accordingly the spring 142 maintains the hooked end of the latch arm in engagement with the switch housing 114 as shown in FIGURE 9. Upon energization of the electromagnet 120 the steel latch 100, which constitutes the armature of the electromagnet, is attracted to the core 126 as shown in FIGURES 8 and 10. The cam lug 108 of the latch 100 is disposed in a slot 146 in the electromagnet shell 122 and the latch arm is moved out of the plane of the switch actuator 140 whereby the inherent resiliency in the leaf spring 132 will engage contact 134 with stationary contact 136. In addition, the offset hook 106 of the latch 100 is disengaged from the lug 66 of the drive pawl as clearly seen in FIGURE 8. The latch 100 remains in the position of FIGURES 8 and 10 as long as the electromagnet 120 is energized. However, upon deenergization of the electromagnet 120, the spring 142 will pivot the latch 100 and extend it outwardly into the path of movement of the lug 66 on the drive pawl 62, as shown in FIGURE 4. During movement of the latch 100 by the spring 142 when the electromagnet 120 is deenergized, the cam lug 108 forces the latch towards the switch housing 114 due to engagement of the cam lug with the lower surface of the electromagnet shell 122. The function of the cam 108 is to assure that the latch 100 will move into engagement with the switch housing 114 notwithstanding any residual magnetism in the core 126 or the latch when the electromagnet is deenergized.

Referring to FIGURE 3, the energizing circuit for the electric motor 20 will be described. The motor 20 includes a wound armature 150, one side of which is grounded and the other side of which is connected to a series field winding 152 and a shunt field winding 154.

The juncture between the series and shunt field windings is connected by a wire 156 to the parking switch terminal 138 carrying stationary contact 136. The other end of the shunt field winding 154 is connected to a wire 158 having a connection with a resistor 160 and a stationary contact 162 of a manual control switch. The movable parking switch contact 134 and its leaf spring 132 are connected by wire 164 through an automatic overload circuit breaker 166 to one terminal of a battery 168, the other terminal of which is grounded. The coil 124 of the electromagnet is connected by wire 170 to the wire 164 at one end, and the other end of the coil 124 is connected by wire 172 to stationary switch contact 174 of the manual control switch.

The manual control switch includes a movable bridging contact 176 having three positions, "off," "low" and "high." In the "off" position the electromagnet coil 124 is deenergized. The wiper motor is controlled by the parking switch comprising contacts 134 and 136. When the movable switch contact 176 is moved to the "low" speed position, the magnet coil 124 is energized thereby attracting the latch 100 to the core 126 so as to disengage the latch 100 from the actuator 140 and allow the parking switch to close due to the inherent resilient bias of the switch blade 132 towards the stationary contact 136. Accordingly, the motor 20 will be energized for low speed operation from the battery 168 through the overload circuit breaker 166, the wire 164, the leaf spring 132, switch contacts 134 and 136, terminal 138 and wire 156 to the series field winding 152 and the armature 150. The shunt field winding 154 is energized from the wire 156 through wire 158 and switch contacts 162 and 176, the contact 176 being grounded. When the switch contact 176 is moved to the "high" speed position, the resistor 160 is connected in series with the shunt field winding 154 to reduce the energization thereof and thus increase the speed of the motor 20. When the movable contact 176 is returned to the "off" position, the coil 124 is deenergized, but the parking switch remains closed until the crank assembly reaches its parked position whereat the latch 100 will engage the actuator 140 to separate contacts 134 and 136 and thus deenergize the motor.

*Operation*

With reference to FIGURES 3 through 10, a complete cycle of operation will be described starting from the parked position and returning to the parked position. When movable contact 176 of the manual switch is moved to either the "low" or "high" speed position, with the actuating mechanism in the parked position as shown in FIGURE 5, the electromagnet 120 will be energized. Energization of the electromagnet 120 will attract the latch 100 and move it from the position of FIGURES 7 and 9 to the position of FIGURES 8 and 10. Accordingly, the latch 100 will be disengaged from the switch actuator 140 causing the parking switch contacts 134 and 136 to engage so as to energize the motor 20. Concurrently, the hook 106 of latch 100 will be disengaged from the lug 66 of the drive pawl 62 as shown in FIGURE 8. Energization of the motor 20 will result in rotation of the worm gear 34 in the clockwise direction and during the first 180° rotation of the worm gear 34 the shaft 28 will not rotate. However, the lug 66 of the drive pawl will be withdrawn from the slot 146 in the switch housing 114 due to coaction between the follower pin 70 of the drive pawl 62 with the cam slot 82 in the worm gear. After 180° of rotation the follower pin 70 will engage its shoulder 88 and the spring 80 will pivot the lock pawl so as to engage its follower pin 76 with the shoulder 90. During the relative rotation between the shaft 28 and the worm gear 34, the axis 94 of the shaft 28 will be shifted from one side of the axis of the worm gear to the other thereby reducing the throw of the crank to a minimum. Since the latch 100 remains substantially within the switch housing 114 as indicated by the dotted line position in FIGURE 4, continued rotation of the worm gear 34 will impart rotation to the crank shaft 28 about the axis of the worm gear 34 and thus rotate the drive crank 26 so that its crank pin describes the orbit 32'.

Accordingly, the wiper assemblies driven from the crank pin 32 will oscillate throughout their normal running strokes. If the manual switch contact 172 is in the low speed position, the wiper motor 20 will operate at low speed with the resistor 160 short circuited. On the other hand, if the movable switch contact 176 is moved to the high speed position, the resistor 160 will be connected in circuit with the shunt field winding 154 so as to cause the wiper motor 20 to operate at high speed.

When wiper operation is no longer required, the movable switch contact 176 is moved to the "off" position thereby deenergizing the electromagnet 120. When the electromagnet 120 is deenergized the spring 142 extends the latch 100 from the dotted line position of FIGURE 4 to the full line position depicted therein. As alluded to hereinbefore, the cam lug 108 assists the spring 142 in urging the latch towards the switch housing 114 as shown in FIGURES 7 and 9 so that the offset hook 106 of the latch 100 will be in a position to intercept the end 68 of the lug 66 on the drive pawl 62 when the crank mechanism arrives at the angular position shown in FIGURE 4. The motor 20 remains energized for low speed rotation when the electromagnet 120 is deenergized since the parking switch contacts 134 and 136 remain in engagement, and the high speed resistor 160 is shorted out through contacts 176 and 162 of the manual switch.

When the hook 106 of the latch engages the lug 66 of the drive pawl 62 during continued rotation of the worm gear 34, the pin 70 of the drive pawl 62 is withdrawn from engagement with the shoulder 88 thereby interrupting the driving connection between the shaft 28 and the worm gear 34. At this time rotation of the shaft 28 is substantially arrested although, as will be seen by comparing FIGURES 4 and 5, the shaft 28 does move throughout an angle of about 25° as the throw of the crank is increased to a maximum. During continued rotation of the worm gear 34 throughout 180° the axis of the shaft 28 will be moved throughout the distance 2X substantially radially from one side of the axis of the worm gear 34 to the other side of the axis thereof thereby moving the drive crank pin 32 to the position 32' as shown in FIGURE 1. This increase in the throw of the crank assembly will be sufficient to move the wiper assemblies to depressed parked positions. When the mechanism arrives at the position shown in FIGURE 5, that is during shifting of the axis of the shaft 28, it will be appreciated that the drive pawl 62 and its lug 66 will move radially outward thereby effecting inward pivotal movement of the latch 100 from the position of FIGURE 4 to the position of FIGURE 5. Since the latch 100 is now aligned with the switch actuator 140, the latch 100 will engage the actuator 140 to separate the parking switch contacts 136 and 134 when the crank throw is substantially a maximum so as to deenergize the motor 20 and thus arrest rotation of the worm gear 34. It is understood that during relative rotation between the worm gear 34 and the crank assembly, the follower pins on the drive pawl and the lock pawl remain in engagement with the cam slot 82 which has a configuration designed to accommodate the follower pins and in addition extend the drive pawl so as to depress the latch 100 to actuate the parking switch when the crank throw is substantially a maximum.

From the foregoing it is manifest that the present invention provides a simplified variable throw crank mechanism for actuating windshield wiper assemblies, which mechanism is less expensive, smoother in operation, more reliable and quieter than mechanisms heretofore used.

While the embodiment of the present invention as herein disclosed, constitutes a preferred form, it is to be understood that other forms might be adopted.

What is claimed is as follows:

1. Windshield wiper actuating and control mechanism including, an electric motor, variable throw crank means having an interruptible driving connection with said motor, an energizing circuit for said motor including a parking switch comprising a stationary contact and a movable contact resiliently biased into engagement with said stationary contact, a latch supported for limited universal movement, spring means biasing said latch to a first position for interrupting the driving connection between said crank means and said motor to vary the throw of said crank means, said latch being moved to a second position during variation of the throw of said crank means to deflect said movable contact and open said parking switch to deenergize said motor when the throw of the said crank means is substantially a maximum, and means operable to move said latch to a third position to facilitate reestablishment of the driving connection between said crank means and said motor and concurrently release said movable contact to permit closure of said parking switch and energization of said motor.

2. Windshield wiper actuating and control mechanism including, an electric motor, variable throw crank means having an interruptible driving connection with said motor, an energizing circuit for said motor including a parking switch comprising a stationary contact and a movable contact resiliently biased into engagement with said stationary contact, a latch supported for limited universal movement, spring means for pivoting said latch to a first position to interrupt the driving connection between said crank means and said motor to vary the throw of said crank means, said latch being pivotally movable to a second position during variation in the throw of said crank means to deflect said movable contact and open said parking switch to deenergize said motor when the throw of said crank means is substantially a maximum, electrically operable means operable to move said latch to a third position to facilitate reestablishment of the driving conection between said crank means and said motor and concurrently release said movable contact to permit closure of said parking switch and energization of said motor.

3. The windshield wiper actuating and control mechanism set forth in claim 2 wherein said electrically operable means comprises an electromagnet and wherein said latch comprises the armature of said electromagnet, said latch being moved laterally between said second and third positions upon energization of said electromagnet.

4. Windshield wiper actuating and control mechanism including, an electric motor, an energizing circuit for said motor including a parking switch comprising an insulating switch housing having a slot, a stationary contact supported in said switch housing and a movable contact supported in said switch housing and resiliently biased into engagement with said stationary contact, a rotatable driving member connected with said motor, variable throw crank means, means interconnecting said crank means and said driving member to establish an interruptible driving connection therebetween including, a drive pawl having an upstanding lug, a latch supported on said switch housing for limited universal movement, spring means positioning said latch to a first position for intercepting the lug on said drive pawl to interrupt the driving connection between said crank means and said driving member to substantially arrest rotation of said crank means whereby continued rotation of said driving member will vary the throw of said crank means, said drive pawl moving said latch to a second position during variation in the throw of said crank means to deflect said movable contact and open said parking switch to deenergize said motor when the throw of said crank means is substantially a maximum, and means operable to move said latch laterally to a third position wherein it is disengaged from the lug on said drive pawl and releases said movable contact to permit closure of said parking switch, energization of said motor and reestablishment of the driving connection between said drive pawl and said driving member.

5. The windshield wiper actuating and control mechanism set forth in claim 4 wherein said latch has a hook engageable with the lug on said drive pawl, and wherein said latch guides said drive pawl so that the lug moves into the slot in the switch housing during variation in the throw of said crank means.

6. The windshield wiper actuating and control mechanism set forth in claim 4 wherein the last recited means comprises an electromagnet having a shell attached to said switch housing with a coil and a core therein, and wherein said latch comprises the armature of said electromagnet.

7. A parking switch assembly for an electric motor driven windshield wiper actuating mechanism including, an insulating switch housing, a stationary contact supported in said switch housing, a leaf spring blade carrying a movable contact and supported within said housing, said leaf spring blade being inherently resiliently biased to engage the movable contact with said stationary contact, a switch operating member supported for limited universal movement on said switch housing, said switch operating member being pivotally movable to a first position into engagement with said leaf spring blade to deflect said leaf spring blade and separate the movable contact from the stationary contact, and an electromagnet attached to said switch housing for attracting said switch operating member upon energization thereof to move said switch operating member laterally to a second position for releasing said leaf spring blade to permit engagement of the movable switch contact with the stationary contact.

8. A variable throw crank assembly including in combination, a housing, a rotatable driving member journaled in said housing having an eccentric through bore, means rotatably journaling said driving member in said housing, a shaft rotatably journaled within the eccentric through bore of said driving member, a crank connected to one end of said shaft, a plate attached to the other end of said shaft, a drive pawl pivotally mounted on said plate, a lock pawl pivotally mounted coaxially with said drive pawl on said plate, resilient means interconnecting said drive pawl and said lock pawl, said driving member having a cam slot with a pair of spaced shoulders, said drive and lock pawls being engageable with said shoulders to establish an interruptible driving connection between said shaft and said driving member, said drive pawl having a lug, and a latch having a hook engageable with said lug for disengaging the drive pawl from its shoulder in said cam slot to interrupt the driving connection between said driving member and said shaft whereby continued rotation of said driving member will displace the shaft to vary the throw of said crank.

9. Windshield wiper actuating and control mechanism including, an electric motor, an energizing circuit for said motor including a parking switch, a rotatable driving member drivingly connected with said motor, variable throw crank means, means interconnecting said crank means and said driving member to establish an interruptible driving connection therebetween including a drive pawl, a latch engageable with said drive pawl for interrupting the driving connection between said crank means and said driving member to substantially arrest rotation of said crank means hereby continued rotation of said driving member will vary the throw of said crank means, spring means for moving said latch to a position for engagement with said drive pawl, an electromagnet which, when energized, moves said latch to a position wherein said latch is disengaged from said drive pawl, a manual switch for controlling energization of said electromagnet, and cam means integral with said driving member and engageable with said drive pawl for moving said drive pawl and said latch to a third position during relative rotation between said driving member and said crank means to actuate said parking switch and deenergize said motor.

10. Windshield wiper actuating and control mechanism including, an electric motor, an energizing circuit for said motor including a parking switch comprising a stationary contact and a movable contact resiliently biased into engagement with said stationary contact, a rotatable driving member connected to said motor having an eccentric through bore, a shaft rotatably journaled within the eccentric through bore of said driving member, crank means connected to said shaft, means interconnecting said shaft and said driving member to establish an interruptible driving connection therebetween, a latch supported for limited universal movement, means operable to move said latch to a first position for interrupting the driving connection between said shaft and said driving member to substantially arrest rotation of said shaft whereby continued rotation of said driving member will effect relative movement between said driving member and said shaft to displace said shaft and vary the throw of said crank means, and means operable during variation in the throw of said crank means to move said latch to a second position for deflecting said movable contact to open said parking switch and deenergize said motor.

11. The windshield wiper actuating and control mechanism set forth in claim 10 wherein the means interconnecting said shaft and said driving member includes a spring biased pivotally supported drive pawl having an upstanding lug, and wherein said latch has a hook for receiving said lug to pivot said drive pawl and interrupt the driving connection between said shaft and said driving member.

12. The windshield wiper actuating mechanism set forth in claim 11 including an electromagnet for effecting lateral movement of said latch from said second position to a third position to disengage the hook of the latch from the lug on said drive pawl and to release said movable contact to permit closure of said parking switch and energization of said motor.

13. The windshield wiper actuating and control mechanism set forth in claim 10 wherein the parking switch is disposed within an insulating switch housing, said housing having a slot therein, wherein said latch is supported for limited universal movement on said switch housing, an electromagnet attached to said switch housing which, when energized, effects lateral movement of said latch to facilitate reestablishment of the driving connection between the shaft and said driving member and releases said movable contact to permit closure of the parking switch and energization of said motor.

14. The windshield wiper actuating and control mechanism set forth in claim 13 wherein the means for moving said latch to said first position comprises a spring, and wherein said latch includes cam means for biasing said latch away from said electromagnet during pivotal movement thereof by said spring means when the electromagnet is deenergized.

References Cited by the Examiner

UNITED STATES PATENTS

| 2,667,249 | 1/1954 | Bell et al. | 74—75 X |
| 2,828,460 | 3/1958 | Contant et al. | 318—466 |
| 2,861,457 | 11/1958 | Harrison | 74—75 |

FOREIGN PATENTS

| 1,191,101 | 4/1959 | France. |

ORIS L. RADER, *Primary Examiner.*

MILTON O. HIRSHFIELD, *Examiner.*

J. C. BERENZWEIG, *Assistant Examiner.*